United States Patent
Carcone et al.

(10) Patent No.: US 11,358,726 B2
(45) Date of Patent: Jun. 14, 2022

(54) SURFACE DEICING DEVICE CONFIGURED NOT TO GENERATE ELECTROMAGNETIC INTERFERENCE

(71) Applicant: Airbus Operations SAS, Toulouse (FR)

(72) Inventors: Jonathan Carcone, Toulouse (FR); Pierre-Louis Roux, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 601 days.

(21) Appl. No.: 16/253,397

(22) Filed: Jan. 22, 2019

(65) Prior Publication Data

US 2019/0233127 A1 Aug. 1, 2019

(30) Foreign Application Priority Data

Jan. 26, 2018 (FR) ...................................... 1850624

(51) Int. Cl.
| | | |
|---|---|---|
| *B64D 15/06* | (2006.01) | |
| *B64D 15/22* | (2006.01) | |
| *B64D 15/12* | (2006.01) | |
| *B64D 15/02* | (2006.01) | |
| *B64D 15/04* | (2006.01) | |

(52) U.S. Cl.
CPC ............. *B64D 15/06* (2013.01); *B64D 15/02* (2013.01); *B64D 15/12* (2013.01); *B64D 15/22* (2013.01); *B64D 15/04* (2013.01)

(58) Field of Classification Search
CPC .................................................... B64D 15/02
See application file for complete search history.

(56) References Cited

U.S. PATENT DOCUMENTS

| | | | | |
|---|---|---|---|---|
| 2,723,092 A | * | 11/1955 | Paselk ................... | B64D 15/02 244/134 B |
| 2,755,216 A | * | 7/1956 | Lemons ................. | B64D 15/02 156/155 |
| 7,882,888 B1 | | 2/2011 | Bugby et al. | |

(Continued)

FOREIGN PATENT DOCUMENTS

| | | |
|---|---|---|
| FR | 2631745 A1 | 11/1989 |
| FR | 2954280 A1 | 6/2011 |
| JP | 2002111357 A | 4/2002 |

OTHER PUBLICATIONS

French Search Report; priority document.

*Primary Examiner* — Philip J Bonzell
*Assistant Examiner* — Michael B. Kreiner
(74) *Attorney, Agent, or Firm* — Greer, Burns & Crain, Ltd.

(57) ABSTRACT

A device for deicing a wall of an aircraft, comprising a closed circuit. The closed circuit comprises at least one condenser, positioned in the environment of the wall that is to be deiced, and in which a heat-transfer fluid condenses, generating energy in the form of latent heat which is transmitted to the wall that is to be deiced, at least one evaporator positioned in the environment of a heat source sited remotely with respect to the wall, and in which the heat-transfer fluid evaporates, absorbing energy in the form of latent heat coming from the heat source. At least part of the closed circuit is facing, in contact with, or positioned in, the wall that is to be deiced, being made of a material transparent to electromagnetic fields.

11 Claims, 1 Drawing Sheet

(56) References Cited

U.S. PATENT DOCUMENTS

| | | |
|---|---|---|
| 8,783,619 B2 | 7/2014 | Hormiere et al. |
| 2012/0312925 A1 | 12/2012 | Asfia et al. |
| 2015/0191238 A1* | 7/2015 | Hucker .................. B29C 70/06 |
| | | 244/117 R |
| 2017/0113804 A1* | 4/2017 | Blanco Maroto ... F28D 15/0266 |
| 2019/0118955 A1* | 4/2019 | Porte ...................... B64D 33/02 |
| 2019/0382130 A1* | 12/2019 | Bar Yohai .............. B64D 33/10 |

* cited by examiner

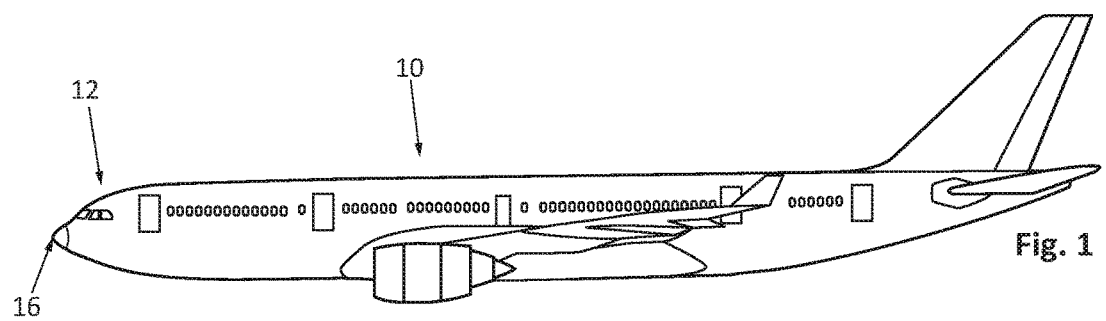
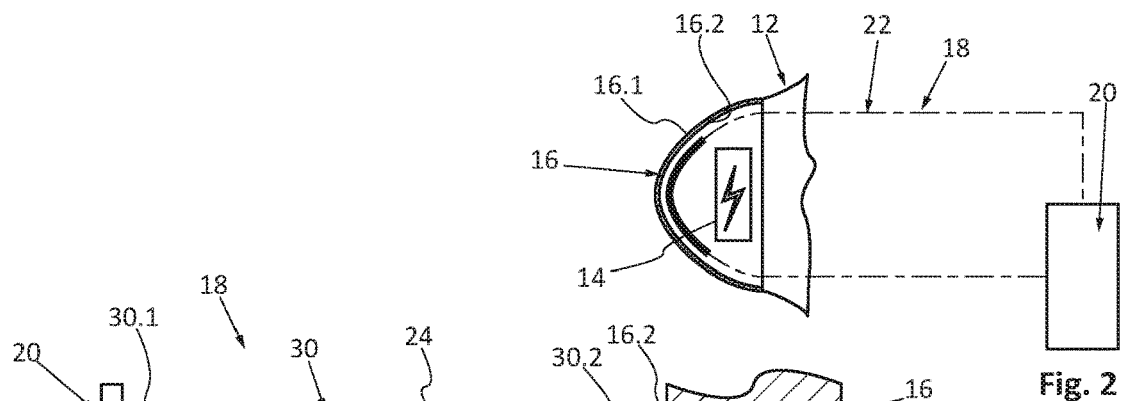
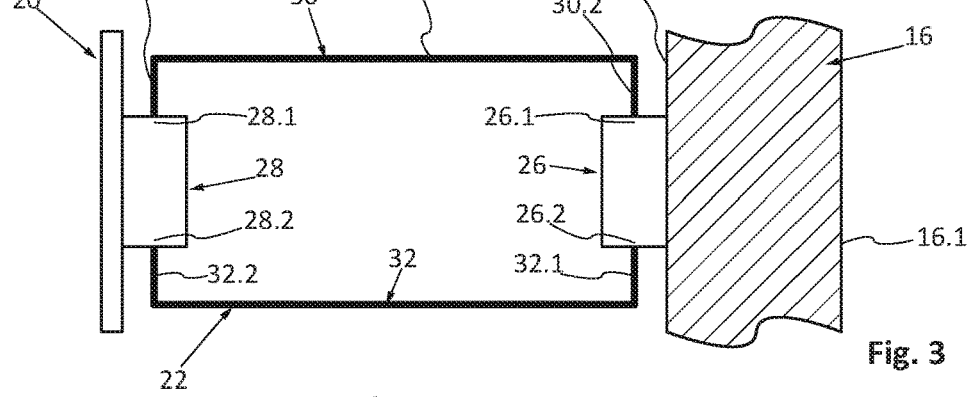
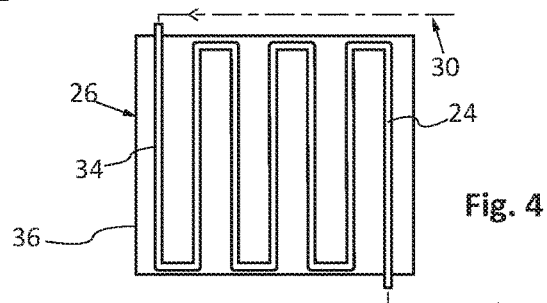
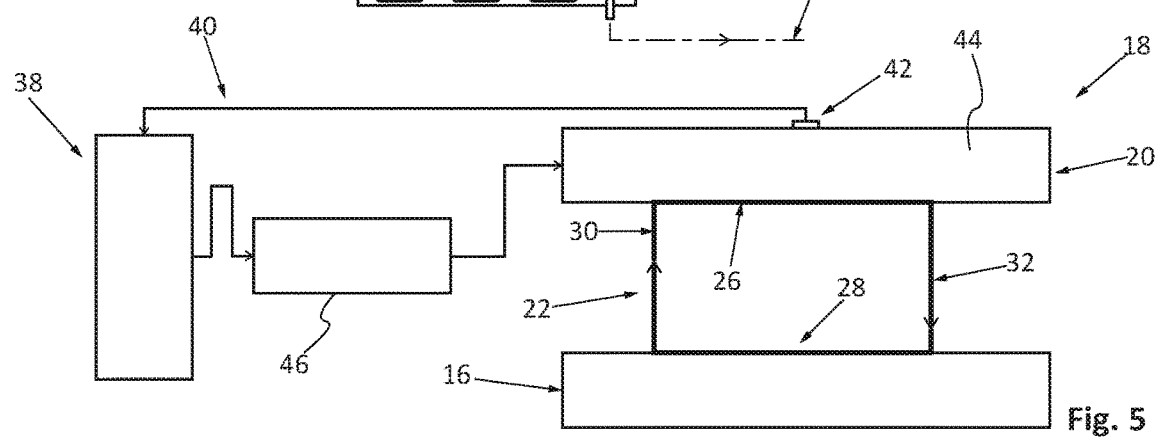

SURFACE DEICING DEVICE CONFIGURED NOT TO GENERATE ELECTROMAGNETIC INTERFERENCE

CROSS-REFERENCES TO RELATED APPLICATIONS

This application claims the benefit of the French patent application No. 1850624 filed on Jan. 26, 2018, the entire disclosures of which are incorporated herein by way of reference.

FIELD OF THE INVENTION

The present application relates to a surface deicing device configured not to generate electromagnetic interference.

BACKGROUND OF THE INVENTION

Certain surfaces of an aircraft need to be deiced in order to limit the appearance and/or accretion of ice.

According to a first embodiment, described in document FR2954280 and used to deice the air intakes of aircraft nacelles and wing structures, a deicing device comprises at least one source of hot air, at least one injection system for injecting the hot air, bled from the source near the surface that is to be deiced, and at least one run of piping to convey the hot air from the hot air source to the injection system.

According to this first embodiment, the hot air is bled off the compression stages of the engines which act as hot air sources. Since the hot air conveyed and injected is at a temperature in excess of 250° C., each run of piping and each injection system of the deicing device are made from a metallic material resistant to high temperatures.

A deicing device according to the first embodiment cannot be used to deice a surface situated near a system that is sensitive to electromagnetic fields, such as a radar, a probe or an antenna, because the metallic parts of which it is made are liable to generate electromagnetic interference.

According to a second embodiment used for the windscreens, the small surfaces or surfaces distant from the engines, a deicing device comprises at least one network of electrically conductive elements, affixed against one of the faces of the surface that is to be deiced, and which are configured to dissipate heat through a joule effect.

A deicing device according to the second embodiment cannot be used to deice a surface situated near a system sensitive to electromagnetic fields such as a radar, a probe or an antenna because the network of electrically conductive elements generates electromagnetic fields liable to disturb the correct operation of the system sensitive to electromagnetic fields.

According to a third embodiment described in document FR2922050 and used to deice a radome, a deicing device comprises a hot air generator, configured to heat fresh air and deliver it at a desired temperature, a set of hot air supply piping, configured to convey the air heated by the hot air generator towards the surface of the radome and diffuse it in the form of a laminar air flow, and a set of return piping configured to collect the diffused air on the surface of the radome and convey it towards the hot air generator.

This third embodiment is relatively complicated to implement because it is very difficult to diffuse the hot air in the form of a laminar air flow, particularly over a curved surface, and even more difficult to recover it in order to heat it back up.

According to a fourth embodiment described in document FR2631745, a deicing device comprises a radome having two thin sheets of rigid polycarbonate, and partition walls positioned between the thin sheets to create a plurality of passages in which the hot air circulates. This radome delimits an enclosure in which an antenna is positioned. The deicing device also comprises a heating and circulation system configured to heat the air present in the enclosure and inject it into the passages of the radome, the cooled air leaving the passages of the radome being delivered into the enclosure.

This fourth embodiment is sometimes unsatisfactory under certain conditions because the air circulating in the radome needs to be at a temperature that is not too high, and compatible with the material of the radome. In addition, the efficiency of such a deicing device is not optimal. The present invention seeks to overcome the disadvantages of the prior art.

SUMMARY OF THE INVENTION

To this end, one subject of the invention is a device for deicing a wall of an aircraft, comprising a heat source, sited remotely with respect to the wall, and at least one closed circuit configured to carry a heat-transfer fluid between the heat source and the wall that is to be deiced. According to the invention, the closed circuit comprises:

at least one part facing, in contact with, or positioned in, the wall that is to be deiced, made from a material that is transparent to electromagnetic fields, at least one condenser facing, in contact with, or positioned in, the wall that is to be deiced, and in which the heat-transfer fluid condenses, generating energy in the form of latent heat which is transmitted to the wall that is to be deiced, and at least one evaporator facing, in contact with, or positioned in, the heat source, and in which the heat-transfer fluid evaporates, absorbing energy in the form of latent heat from the heat source.

The deicing device according to the invention makes it possible to achieve effective deicing of a wall without generating electrical current and without the use of metallic elements in the vicinity of the wall. When the protective wall is protecting a measurement or communication instrument, the deicing device contributes to improving the accuracy and/or correct operation thereof.

According to one embodiment, the part of the closed circuit facing, in contact with or positioned in, the wall that is to be deiced, is made of composite material.

According to another feature, the condenser comprises at least one tube which extends between an inlet and an outlet of the condenser, describing a serpentine so as to at least partially cover the wall that is to be deiced.

According to a first embodiment, the condenser takes the form of a plate made from a material having high thermal conductivity, which has two mutually parallel faces, one of which is configured to be held closely against the wall that is to be deiced, the tube or tubes being positioned in the plate between its two faces.

According to a second embodiment, the condenser is integrated into the wall that is to be deiced, the tube or tubes being positioned between the faces of the wall that is to be deiced.

According to a first configuration, the closed circuit is a capillary heat pipe using the capillarity effect to return the heat-transfer fluid from the condenser towards the evaporator.

According to a second configuration, the closed circuit is a gravity heat pipe using the effect of gravity to return the heat-transfer fluid from the condenser towards the evaporator.

According to another feature, the deicing device comprises a control loop which comprises a regulating system for regulating the temperature of the heat source, a sensor configured to measure a characteristic of the heat source and transmit at least one measured value of the characteristic to the regulating system.

According to one embodiment, the heat source is an electrothermal system, and the deicing device comprises an electric power supply operated by the regulating system and configured to supply power to the electrothermal system, the sensor being a temperature sensor configured to measure the temperature of the electrothermal system and to transmit at least one measured value of the temperature to the regulating system.

Another subject of the invention is an aircraft comprising at least one measurement or communication instrument protected by a protective wall equipped with a deicing device as indicated hereinabove.

BRIEF DESCRIPTION OF THE DRAWINGS

Further features and advantages will become apparent from the following description of the invention, which description is given purely by way of example, with reference to the attached drawings among which:

FIG. 1 is a side view of an aircraft,

FIG. 2 is a diagram of a radome equipped with a deicing device illustrating one embodiment of the invention, FIG. 3 is a diagram of a deicing device illustrating one embodiment of the invention, FIG. 4 is a diagram of a condenser of a deicing device illustrating one embodiment of the invention, and FIG. 5 is a diagram of a regulating system of a deicing device illustrating one embodiment of the invention.

DETAILED DESCRIPTION OF THE PREFERRED EMBODIMENTS

As illustrated in FIG. 1, an aircraft 10 has a nose cone 12 in which there is housed an element that is to be protected 14 (visible in FIG. 2), such as a radar, for example, protected by a protective wall 16, referred to as a radome, which forms part of the fuselage of the aircraft 10.

As depicted in FIG. 2, the protective wall 16 has an exterior face 16.1 over which streams of air flow in flight and may form ice, and an interior face 16.2 facing towards the element that is to be protected 14.

The aircraft 10 comprises at least one deicing device 18 configured to limit the appearance and/or accretion of ice on the protective wall 16.

Of course, the invention is not restricted to this application. Thus, the deicing device 18 may be used to limit the appearance and/or accretion of ice on any protective wall covering a radar, a probe, an antenna or any other measurement or communication element sensitive to magnetic fields, and, more broadly, any wall of an aircraft on which ice may form.

As illustrated in FIGS. 2 and 3, the deicing device 18 comprises at least one heat source 20, sited remotely with respect to the protective wall and/or the element that is to be protected 14, and at least one closed circuit 22, made from a material transparent to electromagnetic fields and therefore not generating electromagnetic interference, and in which a heat-transfer fluid 24 flows, the closed circuit 22 being configured to convey the heat-transfer fluid 24 between the heat source 20 and the protective wall 16.

What is meant by sited remotely is that the heat source 20 is sufficiently distant from the element that is to be protected 14 that it does not disturb the correct operation thereof.

According to one configuration, the heat source 20 is an electrothermal system or heat air, for example bled off an engine of the aircraft 10 or heated by an electrothermal system. What is meant by an electrothermal system is at least one network of electrically conductive elements configured to dissipate heat through a joule effect.

According to one feature of the invention, the closed circuit 22 comprises at least one part facing, in contact with, or positioned in, the protective wall 16 and/or the wall of the element that is to be protected 14 and made from a material transparent to electromagnetic fields and that does not generate electromagnetic disturbance.

For the case of the present application, two elements are positioned facing one another if they are separated by a distance less than or equal to 5 cm, this distance not impairing the transfer of heat between the two elements.

According to one embodiment, at least the part of the closed circuit 22 that is facing the element that is to be protected 14 is made from a composite material, such as, for example, from glass fibers or carbon fibers embedded in a thermoplastic or thermosetting resin matrix.

According to an embodiment visible in FIG. 3, the closed circuit 22 comprises at least one condenser 26 facing, in contact with, or positioned in, the protective wall 16 that is to be deiced, and in which, in operation, the heat-transfer fluid 24 condenses, generating energy in the form of latent heat transmitted to the protective wall 16; at least one evaporator 28 facing, in contact with, or positioned in, the heat source 20, and in which, in operation, the heat-transfer fluid 24 evaporates, absorbing energy in the form of latent heat coming from the heat source 20; at least a first pipe 30 configured to convey the heat-transfer fluid 24 from the evaporator 28 towards the condenser 26 and at least one second pipe 32 configured to convey the heat-transfer fluid 24 from the condenser 26 towards the evaporator 28.

The first pipe 30 comprises a first end 30.1 connected to an outlet 28.1 of the evaporator 28, and a second end 30.2 connected to an inlet 26.1 of the condenser 26.

The second pipe 32 comprises a first end 32.1 connected to an outlet 26.2 of the condenser 26 and a second end 32.2 connected to an inlet 28.2 of the evaporator 28.

The evaporator 28 is sized according to the temperature range of the heat source 20 and according to the nature of the heat-transfer fluid 24 so as to achieve evaporation of the heat-transfer fluid 24 between the inlet 28.2 and the outlet 28.1 of the evaporator 28, the heat-transfer fluid 24 being in the liquid state at the inlet 28.2 of the evaporator 28 and in the gaseous state at the outlet 28.1 of the evaporator 28.

The condenser 26 is sized according to the deicing requirements and according to the nature of the heat-transfer fluid 24 so as to achieve condensation of the heat-transfer fluid 24 between the inlet 26.1 and the outlet 26.2 of the condenser 26, the heat-transfer fluid 24 being in the gaseous state at the inlet 26.1 of the condenser 26 and in the liquid state at the outlet 26.2 of the condenser 26.

Using, for deicing, energy in the form of latent heat produced during the change in phase of the heat-transfer fluid 24 in the condenser 26 makes it possible to be able to use a heat-transfer fluid 24 that has a lower temperature in the closed circuit 22 and thereby optimize the efficiency of the deicing device 18.

By way of indication, the temperature of the heat-transfer fluid 24 is less than or equal to 12° C. at the source.

According to one embodiment, the heat-transfer fluid 24 is air or methanol.

According to one embodiment, the condenser 26 comprises at least one tube 34 which extends between the inlet 26.1 and the outlet 26.2 of the condenser 26, describing a serpentine so as to at least partially cover the protective wall 16 which may be planar or curved.

According to one embodiment, the condenser 26 takes the form of a flexible plate 36, made from a material having high thermal conductivity, which has two mutually parallel faces, one of which is configured to be held closely against the protective wall 16, the tube or tubes 34 being positioned in the flexible plate 36 between its two faces.

According to one configuration, the condenser 26 is held closely against the interior face 16.2 of the protective wall 16 and is kept closely against the interior face 16.2 of the protective wall by bonding, for example.

According to another embodiment, the condenser 26 is integrated into the protective wall 16, the tube 34 being positioned between the interior and exterior faces 16.1, 16.2 of the protective wall 16.

The evaporator 28 may take the form of a heat exchanger.

In operation, when the heat-transfer fluid 24 evaporates in the evaporator 26, that gives rise to a slightly raised pressure which causes a natural flow of the heat-transfer fluid 24 from the evaporator 28 towards the condenser 26. To ensure that the heat-transfer fluid 24 returns from the condenser 26 towards the evaporator 28 it is possible to employ gravity by positioning the condenser 26 at a point that is higher up than the evaporator 28, or capillarity by using a suitable internal structure of the second pipe 32 or by fitting a pump or a circulator on the second pipe 32.

According to one embodiment, the closed circuit 22 is a capillary heat pipe using the capillarity effect to return the heat-transfer fluid 24 from the condenser 26 towards the evaporator 28, or a gravity heat pipe using the effect of gravity to return the heat-transfer fluid 24 from the condenser 26 to the evaporator 28.

The deicing device 18 comprises a regulating system 38 configured to regulate the temperature of the heat source 20 and ultimately the deicing capability.

According to one configuration, the deicing device 18 comprises a control loop 40 which comprises, in addition to the regulating system 38, a sensor 42 configured to measure a characteristic of the heat source 20, more particularly its temperature, and to transmit at least one measured value of this characteristic to the regulating system 38.

According to one embodiment, when the heat source 20 is an electrothermal system 44, the deicing device comprises an electric power supply 46 operated by the regulating system 38 and configured to supply power to the electrothermal system 44 and to a temperature sensor 42 configured to measure the temperature of the electrothermal system 44 and to transmit at least one measured value of the temperature to the regulating system 38.

The deicing device 18 according to the invention makes it possible to achieve effective deicing of a wall without generating electromagnetic interference. In the case of a protective wall 16 protecting a measurement or communication instrument, the deicing device 18 allows its precision and/or correct operation to be improved with respect to the problems of icing which, in the absence of the deicing device according to the invention, could become impaired as the result of a buildup of ice or as the result of electromagnetic interference.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A device for deicing a wall of an aircraft, comprising:
a heat source sited remotely with respect to the wall,
at least one closed circuit having a first pipe configured to carry a heat-transfer fluid from the heat source to the wall that is to be deiced and a second pipe configured to return the heat-transfer fluid from the wall that is to be deiced to the heat source, the closed circuit comprising:
at least one condenser made from a material that is transparent to electromagnetic fields, the at least one condenser facing, in contact with, or positioned in, the wall that is to be deiced, and in which the heat-transfer fluid condenses, generating energy in the form of latent heat which is transmitted to the wall that is to be deiced, and
at least one evaporator facing, in contact with, or positioned in, the heat source, and in which the heat-transfer fluid evaporates, absorbing latent heat energy from the heat source,
wherein the heat transfer fluid comprises, at an inlet of the at least one evaporator, a liquid and, at an outlet of the at least one evaporator, comprises a vapor.

2. The deicing device according to claim 1, wherein the at least one condenser is made of composite material.

3. The deicing device according to claim 1, wherein the condenser comprises at least one tube which extends between an inlet and an outlet of the condenser, describing a serpentine so as to at least partially cover the wall that is to be deiced.

4. The deicing device according to claim 3, wherein the condenser is formed as a plate made from a material having high thermal conductivity, which has two mutually parallel faces, one of which is configured to be held closely against the wall that is to be deiced, the tube or tubes being positioned in the plate between its two faces.

5. The deicing device according to claim 3, wherein the condenser is integrated into the wall that is to be deiced, the tube or tubes being positioned between the faces of the wall that is to be deiced.

6. The deicing device according to claim 1, wherein the closed circuit is a capillary heat pipe using a capillary effect to return the heat-transfer fluid from the condenser towards the evaporator.

7. The deicing device according to claim 1, wherein the closed circuit is a gravity heat pipe using gravity to return the heat-transfer fluid from the condenser towards the evaporator.

8. The deicing device according to claim 1, wherein the deicing device comprises a control loop which comprises a regulating system for regulating the temperature of the heat source, a sensor configured to measure a characteristic of the heat source and transmit at least one measured value of the characteristic to the regulating system.

9. The deicing device according to claim 8, wherein the heat source is an electrothermal system, and wherein the deicing device comprises an electric power supply operated by the regulating system and configured to supply power to the electrothermal system, the sensor being a temperature sensor configured to measure a temperature of the electrothermal system and to transmit at least one measured value of the temperature to the regulating system.

10. An aircraft comprising at least one measurement or communication instrument protected by a protective wall equipped with a deicing device according to claim 1.

11. A device for deicing a wall of an aircraft, comprising:
   a heat source sited remotely with respect to the wall, wherein the heat source is an electrothermal system;
   at least one closed circuit having a first pipe configured to carry a heat-transfer fluid from the heat source to the wall that is to be deiced and a second pipe configured to return the heat-transfer fluid from the wall that is to be deiced to the heat source, the closed circuit comprising:
      at least one condenser made from a material that is transparent to electromagnetic fields, the at least one condenser facing, in contact with, or positioned in, the wall that is to be deiced, and in which the heat-transfer fluid condenses, generating energy in the form of latent heat which is transmitted to the wall that is to be deiced, and,
      at least one evaporator facing, in contact with, or positioned in, the heat source, and in which the heat-transfer fluid evaporates, absorbing latent heat energy from the heat source;
   a control loop comprising a regulating system for regulating the temperature of the heat source;
   a sensor configured to measure a characteristic of the heat source and transmit at least one measured value of the characteristic to the regulating system; and,
   an electric power supply operated by the regulating system and configured to supply power to the electrothermal system, the sensor being a temperature sensor configured to measure a temperature of the electrothermal system and to transmit at least one measured value of the temperature to the regulating system.

* * * * *